(12) United States Patent
Kimba et al.

(10) Patent No.: US 6,346,694 B1
(45) Date of Patent: Feb. 12, 2002

(54) FOCUS DETECTING DEVICE AND A METHOD FOR THE FOCUS DETECTION

(75) Inventors: Akio Kimba, Suita; Hiroshi Ueda, Habikino; Masataka Hamada, Osakasayama, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/327,515

(22) Filed: Jun. 8, 1999

(30) Foreign Application Priority Data

Jun. 9, 1998 (JP) ............................................ 10-160278

(51) Int. Cl.$^7$ ........................... G02B 7/09; G03B 11/00; G03B 13/36
(52) U.S. Cl. .............................. 250/201.4; 256/201.2; 396/121; 396/114; 396/104
(58) Field of Search ........................... 250/201.4, 201.5, 250/208.1, 216, 201.2; 396/121, 122, 123, 114, 104; 348/349, 350, 353, 355

(56) References Cited

U.S. PATENT DOCUMENTS

| | | | |
|---|---|---|---|
| 5,003,336 A | | 3/1991 | Karasaki et al. |
| 5,530,513 A | * | 6/1996 | Ohsawa ...................... 354/402 |
| 5,539,493 A | * | 7/1996 | Kusaka ........................ 354/402 |
| 5,870,635 A | * | 2/1999 | Shindo et al. ............... 396/121 |

\* cited by examiner

*Primary Examiner*—Frank G. Font
*Assistant Examiner*—Zandra Smith
(74) *Attorney, Agent, or Firm*—Burns, Doane, Swecker & Mathis, LLP

(57) ABSTRACT

A focus detecting device comprising a taking lens for photographing an object, a relay optical system for re-forming an object image via the taking lens, and a detecting means having first and second sensor pairs for detecting the image re-formed by the relay optical system, wherein focus detection is accomplished using one sensor of the first sensor pair and one sensor of the second sensor pair.

9 Claims, 10 Drawing Sheets

FOCUS DETECTING DEVICE AND A METHOD FOR THE FOCUS DETECTION

This application is based on Application No. HEI 10-160278 filed in Japan, the content of which is hereby incorporated by reference.

BACKGROUND OF THE INVENTION

1. Field of the Invention

The present invention relates to a focus detecting device for use in cameras and the like, and specifically relates to a focus detecting device capable of large amount of defocus.

2. Description of the Related Art

The phase difference detecting method is representative of conventional focus detecting methods used in cameras and the like. The phase difference detecting method is the method typically used in modern single-lens reflex cameras. The phase difference detecting method determines the focus state via the relative divergence of a secondary image formed by a separator lens comprising a pair of relay lenses arranged behind a film equivalent plane. FIG. 11 is a perspective view of a conventional autofocus module using the phase difference detecting method. In the drawing, reference number 51 refers to a filter for cutting the infrared component. Reference number 52 refers to a condenser lens. Reference number 53 refers to a mirror. Reference number 54 refers to a an aperture mask. Reference number 55 refers to a separator lens. Reference number 56 refers to a charge-coupled device (CCD) sensor.

As shown in the drawing, the filter 51 cuts the infrared component of the photographic light 50 passing through a taking lens (not shown in the drawing) and forming an image in the vicinity of the film equivalent plane. Furthermore, the light is divided into a pair of luminous fluxes in the on-axis and extra-axis focus areas of the optical axis X by the condenser lens 52 and the aperture mask 54 between which the mirror 53 is interposed. The luminous flux again forms an object image in two areas (standard area and reference area) on the CCD sensor 56 provided in correspondence to a pair of lenses via the separator lens 55.

The re-formed object image has a narrow image interval in the front focus state and a wide image interval in the rear focus state compared to the in-focus state. The focus position is detected by detecting the image interval of the object image on the CCD sensor 56.

However, the focus detecting range in the phase difference detecting method is generally approximately ±10 mm. When the focus detection range is wider than approximately ±10 mm, the distance is increased from the so-called film equivalent plane to the surface of the CCD sensor 56, thus increasing the size of the device. Furthermore, the depth of focus must be ensured to have a focal point at which the secondary image on the surface of the CCD sensor 56 corresponds to a broad focus detecting range. For this reason, a F-number value of the separator lens 55 comprising a relay lens system must be used to produce darkening, thus making use difficult in the low luminance range.

The taking lens which is a weak point of the focus detecting device using the phase difference detecting method is the macro lens. Since this lens has a high photographic magnification of near objects, large movement of focusing (amount of defocus), and an excessively large focus range on a single view of the focus detecting device, the taking lens must be driven to a position at which focus detection is possible. Under low contrast conditions, for example, a slow lens drive control is executed to drive the lens to a position at which focus detection can be achieved (hereinafter referred to as "low contrast scan").

In this instance, since the focus direction is unclear, the operation may move the lens to the end in the direction opposite the focus direction and returning the lens in the focus direction. Since the macro lens has a large amount of extension, time is required to drive the lens, thereby producing a large time loss to attain focus. These disadvantages are similarly present in telephoto lenses. This tendency is particularly pronounced when a telephoto macro lens is used, thus adversely affecting the autofocus operation characteristics.

SUMMARY OF THE INVENTION

An object of the present invention is to provide a focus detecting device capable of detecting the focus direction and correspondingly capable even in the case of a large defocus which cannot be detected by a conventional focus detection device. These objects are attained by the present invention comprising an optical system which forms an image of a photographic subject, a first sensor pair having a first image sensor and a second image sensor which receives light flux from said subject through said optical system, a second sensor pair having a third image sensor and a forth image sensor which receives light flux from said subject through said optical system, a first focus detector which detects a focus condition of said optical system based on outputs of said first sensor pair, a second focus detector which detects a focus condition of said optical system based on outputs of said second sensor pair, and a third focus detector which detects a focus condition of said optical system based on outputs of said first image sensor and said third image sensor.

One image sensor among the first sensor pair and one image sensor among the second sensor pair are arranged at symmetrical positions relative to the optical axis.

A focus correcting lens is inserted directly anterior to one image sensor among the first sensor pair and one image sensor among the second sensor pair, respectively.

This construction provides a focus detecting device capable of detecting the focus direction and correspondingly capable even in the case of a large defocus which cannot be detected by a conventional focus detection device.

BRIEF DESCRIPTION OF THE DRAWINGS

In the following description, like parts are designated by like reference numbers throughout the several drawings.

DETAILED DESCRIPTION OF THE PREFERRED EMBODIMENT

Figure 1:
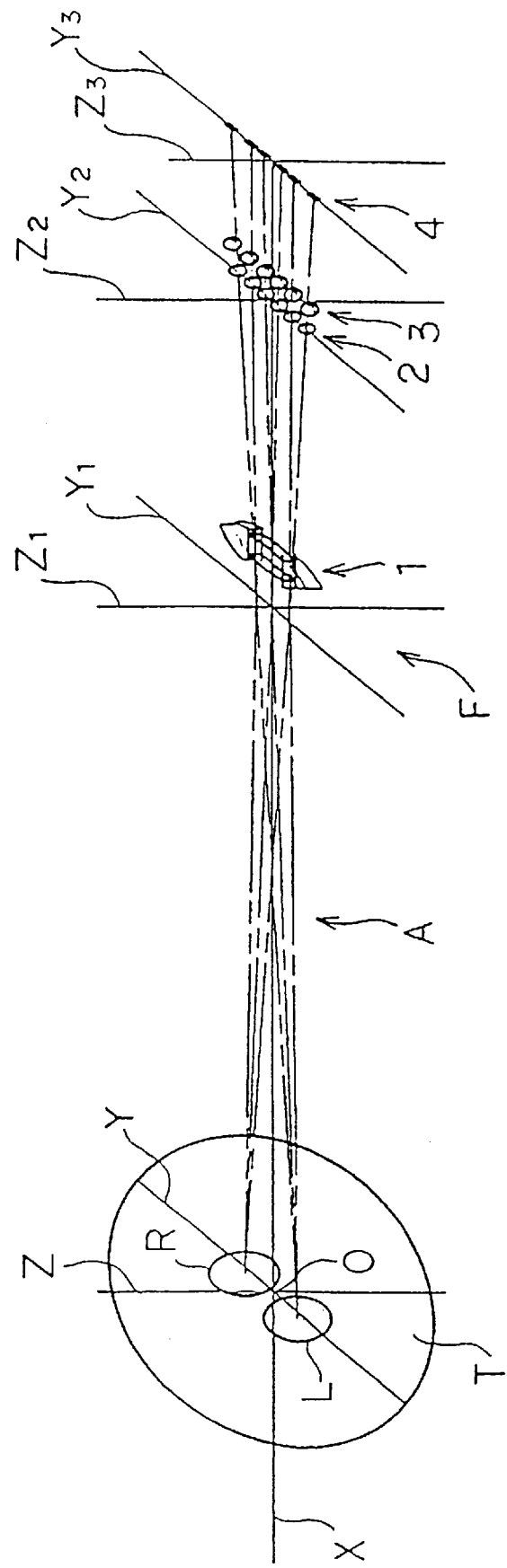
FIG. 1 is a perspective view schematically showing the basic construction of one embodiment of the present invention.

The preferred embodiment of the present invention are described hereinafter with referenced to the accompanying drawings. FIG. 1 is a perspective view schematically showing the basic construction of one embodiment of the present invention. In the drawing, arranged on the optical axis A sequentially from the front, i.e., the left side in the drawing (object side), are a taking lens T, a condenser lens 1, a aperture mask 2, a separator lens 3, and a CCD sensor 4. The taking lens T includes the Y-Z plane having the Y-axis and the Z-axis which are mutually perpendicular and also are perpendicular to the optical axis X, and has a center point O at which the three axes mutually intersect. A film equivalent plane F comprising the Y1-Z1 plane having the Y1-axis and the Z1-axis which are mutually perpendicular and also perpendicular to the optical axis X and, is positioned directly anterior to the condenser lens 1. Each lens element forming the condenser lens 1 is arranged along the Y1-axis as described later.

The aperture mask 2 is positioned within the Y2-Z2 plane having the Y2-axis and the Z2-axis which are mutually perpendicular and are also perpendicular to the optical axis X. Each aperture formed by the aperture mask 2 is positioned along the Y2-axis as described later. Each lens element forming the separator lens 3 is positioned directly behind each aperture so as to correspond to each aperture as described later. Finally, the CCD sensor 4 is positioned within the Y3-Z3 plane having the Y3-axis and the Z3-axis which are mutually perpendicular and also perpendicular to the optical axis X. Line sensors comprising the CCD sensor 4 are arranged in the lengthwise direction along the Y3-axis as described later.

The Y-axis, Y1-axis, Y2-axis, Y3-axis, and the Z-axis, Z1-axis, Z2-axis, Z3-axis are mutually parallel. As shown in the drawing, the luminous flux A, which is indicated by the two-link chain line within the photographic light reflected by the object (not illustrated) and entering the taking lens T on the left side of the drawing, forms an image as an object image on the film-equivalent plane F. The luminous flux A is the luminous flux which has passed through areas L and R on the Y-axis on the left and right sides of the optical axis X as viewed from the image side (right side). This luminous flux is then split into a pair of luminous fluxes in the on-axis and extra-axis focus areas of the optical axis X via the condenser lens 2 and the aperture mask 4. The split luminous flux then re-forms an image as an object image on the line sensors of the standard area and the reference area of two regions provided in correspondence to the luminous fluxes.

Figure 2:
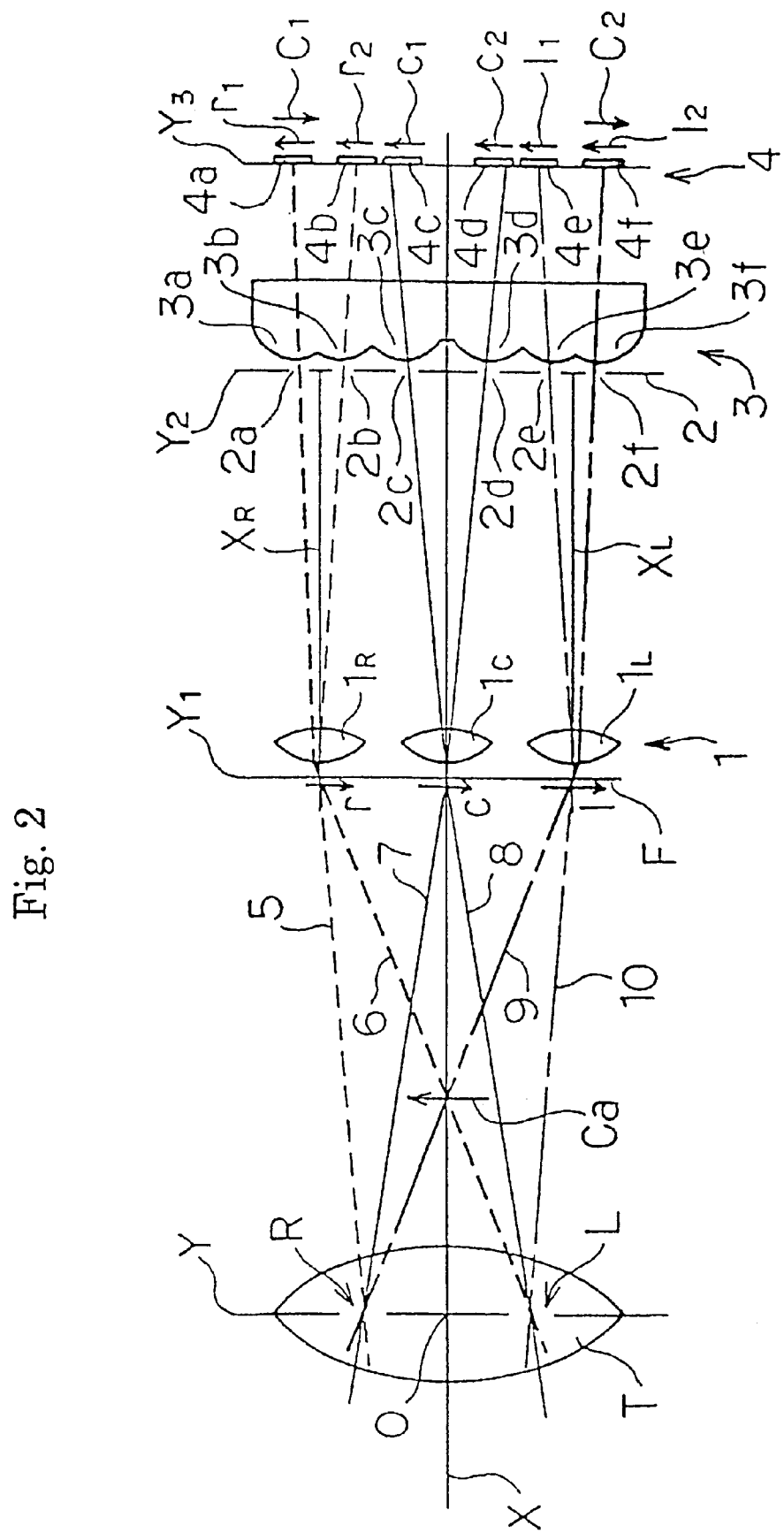
FIG. 2 shows the basic construction of an embodiment of the present invention viewed from above.

FIG. 2 is a schematic view of the construction of FIG. 1 viewed from above in the Z-axis direction. First, the use of a normal taking lens is examined. As viewed from the right hand side of the drawing, the luminous flux entering the taking lens T and passing through area R on the Y-axis within the photographic light reflected by an object positioned on the left side of the drawing and positioned the focus area on the left extra-axis of the optical axis X (downward in the drawing) is designated luminous flux 5 indicated by a thin broken line. The luminous flux entering the taking lens T and passing through area L on the Y-axis within the photographic light reflected from the same object is designated luminous flux 6 indicated by a thick broken line. Both luminous fluxes form an image as an object image r on the film-equivalent plane F.

The light fluxes entering the taking lens T and passing through areas R and L on the Y-axis within the photographic light reflected from an object and entering the on-axis focus area of the optical axis X are designated luminous flux 7 and 8, respectively indicated by solid lines. These luminous fluxes form an image as an object image c on the film-equivalent plane F.

The light flux entering the taking lens T and passing through area R on the Y-axis within the photographic light reflected from an object and entering the right extra-axis focus area of optical axis X is designated luminous flux 9 indicated by a thick single-link chain line. The luminous flux entering the taking lens T and passing through the area L on the Y-axis within the photographic light reflected from the same object is designated luminous flux 10 indicated by a thin single-link chain line. These luminous fluxes form an image as an object image 1 on the film-equivalent plane F. The luminous fluxes 5 through 10 represent the luminous flux A shown in FIG. 1. The object images r, c, and 1 are primary images.

The luminous flux 5 and 6 pass through the lens 1R comprising part of the condenser lens 1 arranged along the Y1-axis direction on the right side extra-axis of the optical axis X viewed from the right side in the drawing. The luminous flux 5 and 6 respectively pass through the apertures 2b and 2a comprising part of the aperture mask 2 arranged along the Y2-axis direction on the right side extra-axis (upward in the drawing) of the optical axis X viewed from the right side of the drawing. The luminous fluxes 5 and 6 respectively re-form an image via the lenses 3b and 3a comprising part of the separator lens 3 provided directly behind apertures 2b and 2a. The luminous fluxes 5 and 6 respectively re-form an image as object images r2 and r1 on line sensors 4b and 4a. The line sensors 4b and 4a are arranged in two areas along the respectively re-form an image as object images r2 and r1 on line sensors 4b and 4a. The line sensors 4b and 4a are arranged in two areas on the CCD sensor 4 along the Y3-axis direction in the right side extra-axis (upward in the drawing) of the optical axis X viewed from the right side of the drawing. XR is the optical axis of the condenser lens 1R.

Similarly, the luminous fluxes 7 and 8 pass through the lens 1C comprising part of the condenser lens 1 arranged along the Y1-axis direction on the optical axis X. Likewise, the luminous fluxes 7 and 8 pass through the apertures 2d and 2c comprising part of the aperture mask 2 arranged along the Y2-axis direction crossing the optical axis X. The light fluxes 7 and 8 respectively re-form an image via the lenses 3d and 3c comprising part of the separator lens 3 provided directly behind apertures 2d and 2c. The luminous fluxes 7 and 8 respectively re-form and image as the object images c2 and c1 on the line sensors 4d and 4c. The line sensors 4d and 4c are arranged in two areas on the CCD sensor 4 along the Y3-axis crossing the optical axis X.

The luminous fluxes 9 and 10 pass through the lens 1L comprising part of the condenser lens 1 arranged along the Y1-axis direction on the left extra-axis of the optical axis X viewed from the right side of the drawing. Similarly, luminous fluxes 9 and 10 respectively pass through the apertures 2f and 2e comprising part of the aperture mask 2 arranged along the Y2-axis direction on the left extra-axis (downward in the drawing) of the optical axis X viewed from the right side of the drawing. The luminous fluxes 9 and 10 respectively re-form images via lenses 3f and 3e comprising part of the separator lens 3 provided directly behind the apertures 2f and 2e. The luminous fluxes 9 and 10 respectively re-form images as object images 12 and 11 on the line sensors 4f and 4e. The line sensors 4f and 4e are arranged in two areas on the CCD sensor 4 along the Y3-axis direction on the left extra-axis (downward in the drawing) of the optical axis X viewed from the right side of the drawing. XL is the optical axis of the condenser lens 1L.

As described above, the object images (secondary images) re-formed on the line sensors arrayed on the CCD sensor 4 have a narrower image interval in the front focus and a wider image interval in the rear focus compared to the focused state. The focus position is detected by detecting the image interval of the object images corresponding to the each focus areas on the CCD sensor 4. Focus position detection via the construction described above is a conventional focus position detection normally performed. The normally performed phase difference detecting method performs a correlation calculation using the paired line sensors 4a, 4b, paired line sensors 4c, 4d, and paired line sensors 4e, 4f. For example, the line sensors 4a, 4c, 4e on the CCD sensor 4 are designated the standard areas, and the corresponding line sensors 4b, 4d, 4f are designated the reference areas.

A macro lens or other lens having a large amount of defocus used as a taking lens is described below. In FIG. 2, the luminous flux entering the large defocus taking lens T and passing through the areas R and L on the Y-axis within the photographic light reflected by an object in the focus areas on the optical axis X is, for example, the luminous flux 9 indicated by the thick single-link chain line and the luminous flux 6 indicated by the thick broken line. These luminous fluxes intersect to form an image as the object image Ca (primary image) on the optical axis X. The drawing show the front focus condition, and it is to be understood that the image is substantially formed at a position anterior to the film-equivalent plane F.

The luminous flux 6 similarly passes through the lens 1R, and passes through the aperture 2a. Then the luminous flux 6 re-forms an image as an object image C1 on the line sensor 4a via the lens element 3a of the separator lens 3 provided behind the aperture 2a.

Similarly, the luminous flux 9 similarly passes through the lens 1L, and passes through the aperture 2f. Then the luminous flux 9 re-forms an image as an object image C2 on the line sensor 4f via the lens element 3f of the separator lens 3 provided behind the aperture 2f.

The approximate focus position can be detected by detecting the image intervals of the object images C1 and C2 (secondary images). In this way at least the direction of the focus points is known, such that the taking lens need not be extended to the end in the opposite direction and returned. That is, usability is improved because of the reduced execution frequency of the so-called low contrast scan required by the conventional method. The taking lens can be moved to the vicinity of the focus position based on the approximate focus position obtained by the current focus detecting method, after which the focus position can be detected via the conventional method. In this way the time loss to focus is substantially reduced.

Figure 3:
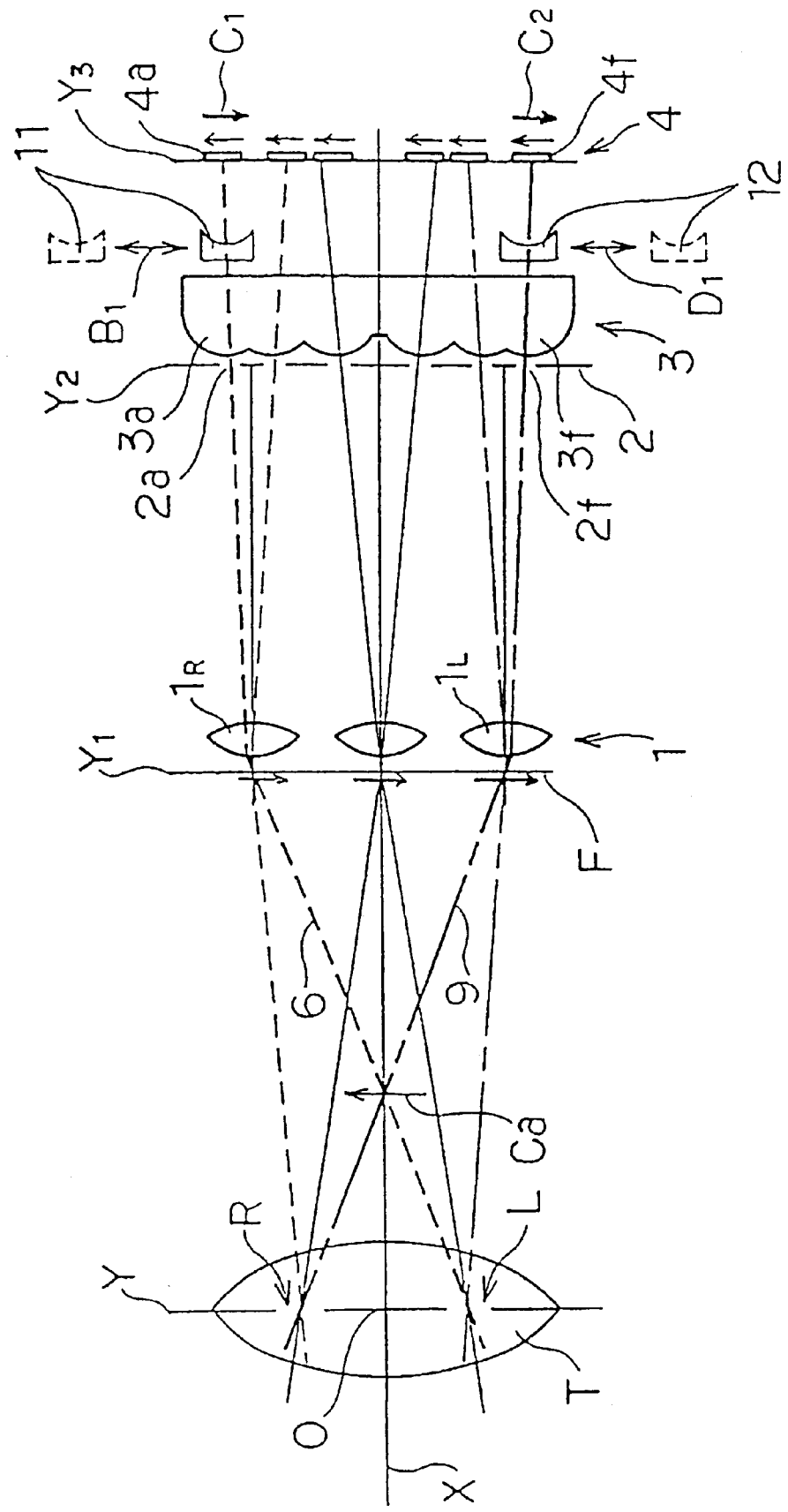
FIG. 3 is a schematic view showing a construction having a concave lens used for front focus correction both inserted and retracted.

In the construction shown in FIG. 2, the secondary images of the object images C1 and C2 are not focused on the CCD line sensor 4, so as to form unfocused images, thus making detection difficult. As shown in FIG. 3, when a large defocus taking lens T is attached and the focus position cannot be detected, the correcting concave lens elements 11 and 12 are inserted in the optical paths of the luminous fluxes 6 and 9 between the CCD sensor 4 and the separator lens 3, as indicated by the arrows B1 and D1 in the drawing. When not in use, these correcting concave lens elements 11 and 12 are automatically retracted as indicated by the respective broken lines in the drawing.

Figure 4:
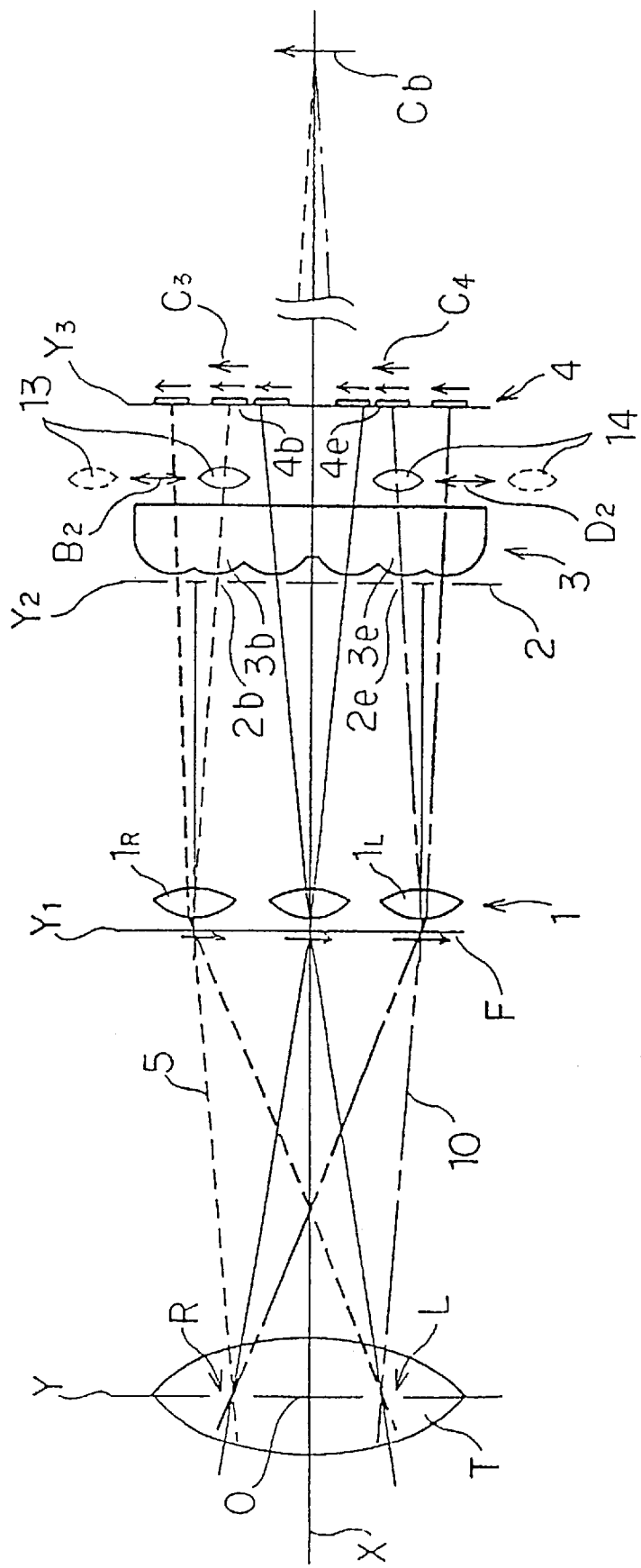
FIG. 4 is a schematic view showing a construction having a convex lens used for rear focus correction both inserted and retracted.

Rear focus condition is shown in FIG. 4. As shown in the drawing, the luminous flux entering the large defocus taking lens T and passing through the areas R and L on the Y-axis within the photographic light reflected from an object in the focus areas on the optical axis X is, for example, the luminous flux 5 indicated by the thin broken line and luminous flux 10 indicated by the thin single-link chain line. Ultimately, in theory, the intersecting light fluxes form an image an object image Cb (primary image) on the optical axis X behind the CCD sensor 4. In this instance, it is understood that the image is formed at a position substantially behind the film-equivalent plane F. The intervening luminous flux is omitted.

The luminous flux 5, similar to the above situation, passes through the lens element 1R, and passes through the aperture 2b. Then, the luminous flux 5 re-forms an image as an object image C3 on the line sensor 4b via the lens element 3b of the separator lens 3 provided behind the aperture 2b.

Likewise, the luminous flux 10 passes through the lens element 1L, and passes through the aperture 2e. Then, the luminous flux 10 re-forms an image as an object image C4 on the line sensor 4e via the lens element 3e of the separator lens 3 provided behind the aperture 2e.

At this point the secondary images of the object images C3 and C4 are not focused on the CCD line sensor 4, so as to form unfocused images, thus making detection difficult. When a large defocus taking lens T is attached and the focus position cannot be detected, the correcting convex lens elements 13 and 14 are inserted in the optical paths of the luminous fluxes 5 and 10 between the CCD sensor 4 and the separator lens 3, as indicated by the arrows B2 and D2 in the drawing. When not in use, these correcting concave lens elements 13 and 14 are automatically retracted as indicated by the respective broken lines in the drawing.

Figure 5:
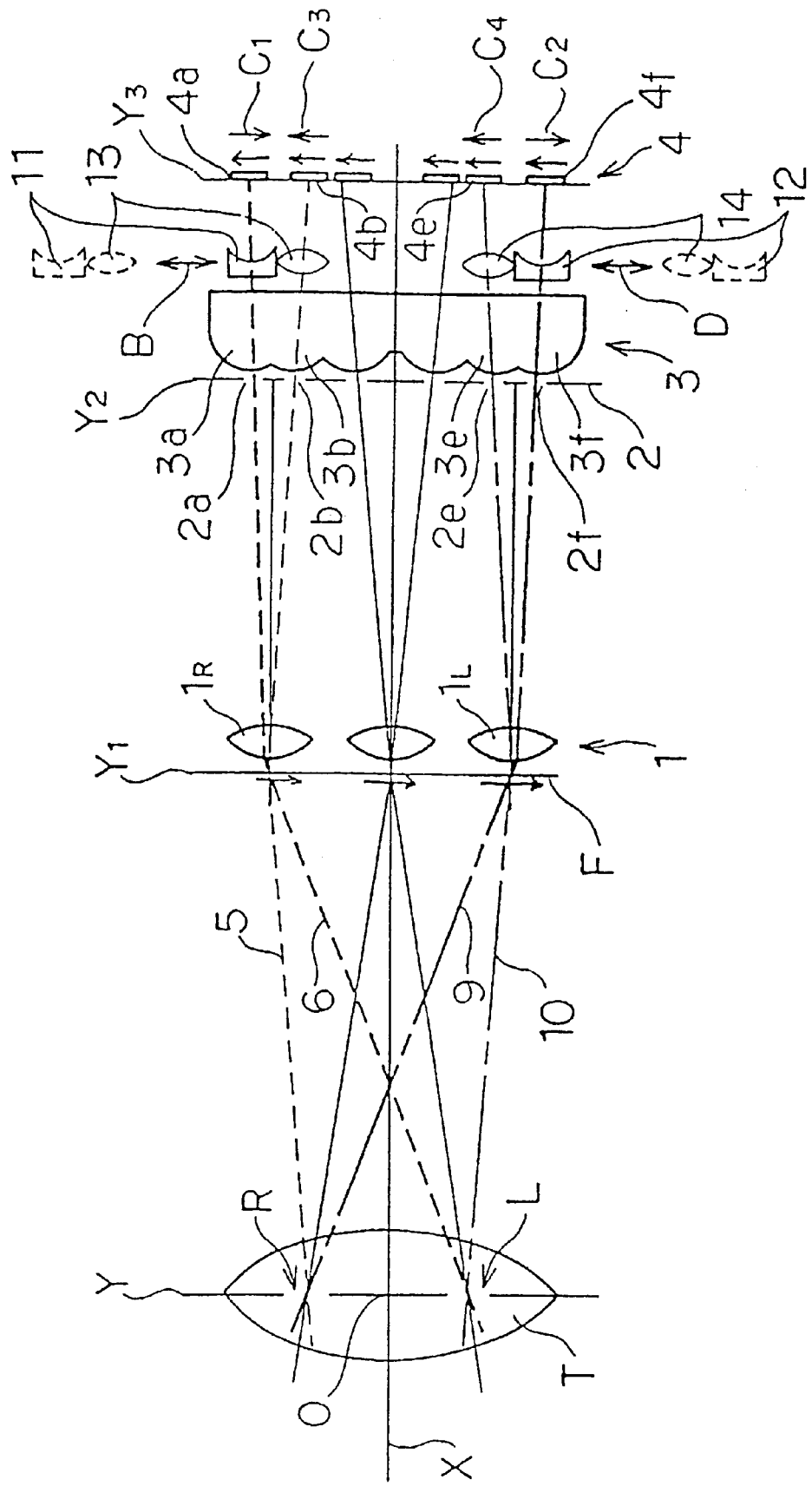
FIG. 5 is a schematic view showing a construction having linked concave lens and convex lens used for correction both inserted and retracted.

The aforesaid construction is capable of focusing in the case of either front focus and rear focus and it is not necessary to determine whether front focus or rear focus obtains. Specifically, as shown in FIG. 5, the concave lens element 11 and the convex lens element 13, and the concave lens element 12 and the convex lens element 14 are inserted in linkage as indicated by the respective arrows B and D. Furthermore, these lens elements are automatically retracted in linkage when not in use, as indicated by the broken lines.

The correlation calculation of the phase difference detecting method when there is a large amount of defocus may be performed, for example, using the line sensor 4a of the CCD sensor 4 as the standard area and the line sensor 4f as the corresponding reference area in the case of front focus. In addition, the line sensor 4e of the CCD sensor 4 may be used as the standard area, and the line sensor 4b may be used as the corresponding reference area in the case of rear focus.

The specific controls executed during focus detection using the aforesaid construction are described below.

Figure 10:
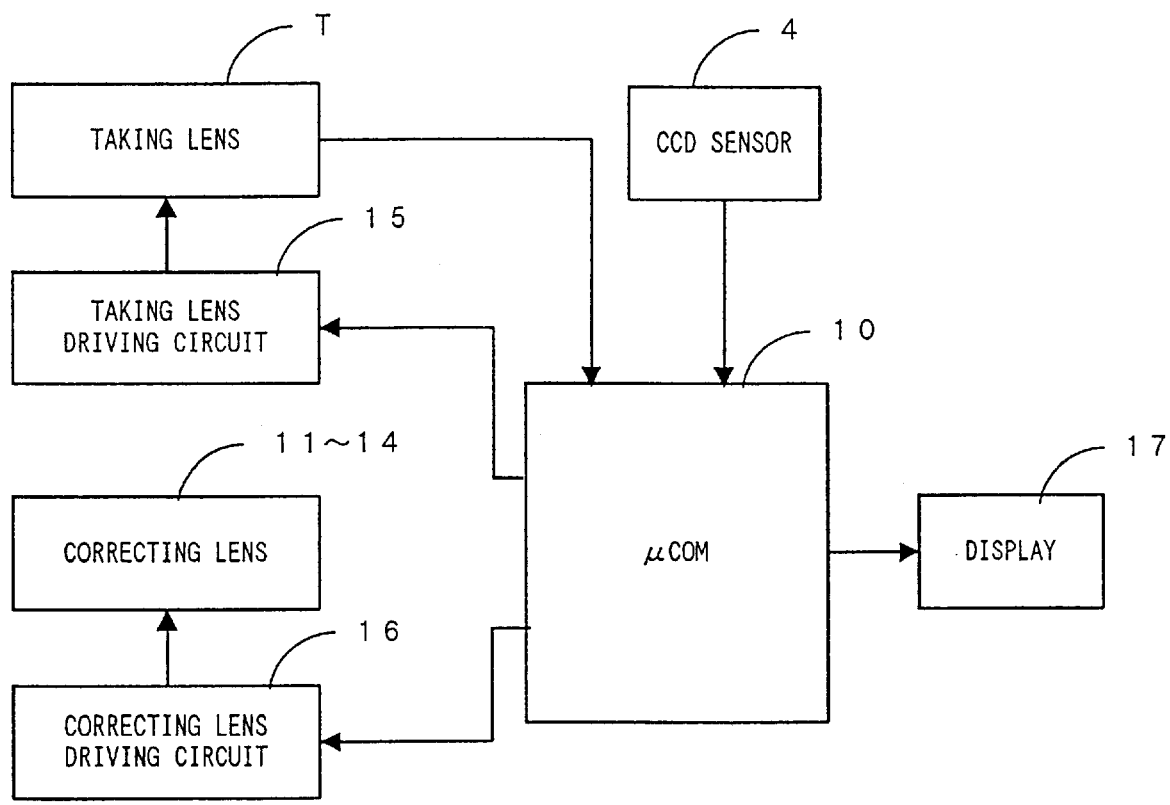
FIG. 10 is a block diagram of the focus detecting device of the present invention.

FIG. 10 is a block diagram of the focus detecting device of the present invention. In the drawing, T refers to the previously mentioned taking lens; information expressing whether or not the lens has a large defocus is transmitted to a microcomputer 10 described later. Reference number 4 refers to the previously mentioned CCD line sensor. Reference number 10 refers to a microcomputer for controlling the entire focus detecting device; the focus is detected based on the output from the CCD sensor 4. Reference numbers 11 through 14 refer to previously mentioned concave and convex correcting lenses. Reference number 15 refers to a drive circuit for driving the taking lens T based on the focus detection result from the microcomputer 10. Reference number 16 refers to a drive circuit for driving the correcting lenses 11 through 14 based on the control signals from the microcomputer 10. Reference number 17 refers to a display device for displaying the focus state and the low contrast state.

Figure 6:
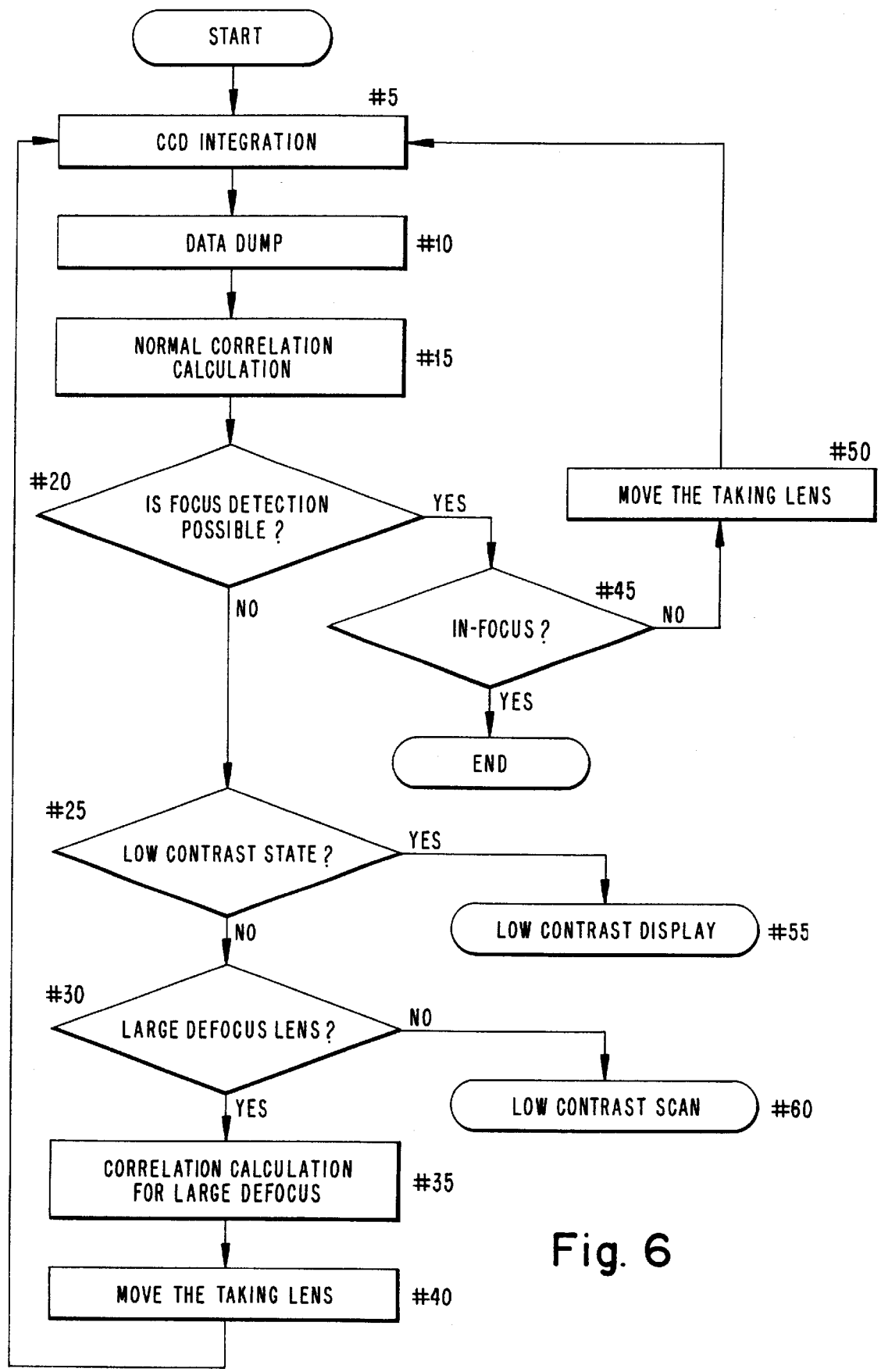
FIG. 6 is a flow chart showing an example of focus detection by the focus detecting device of the present invention.
Figure 7:
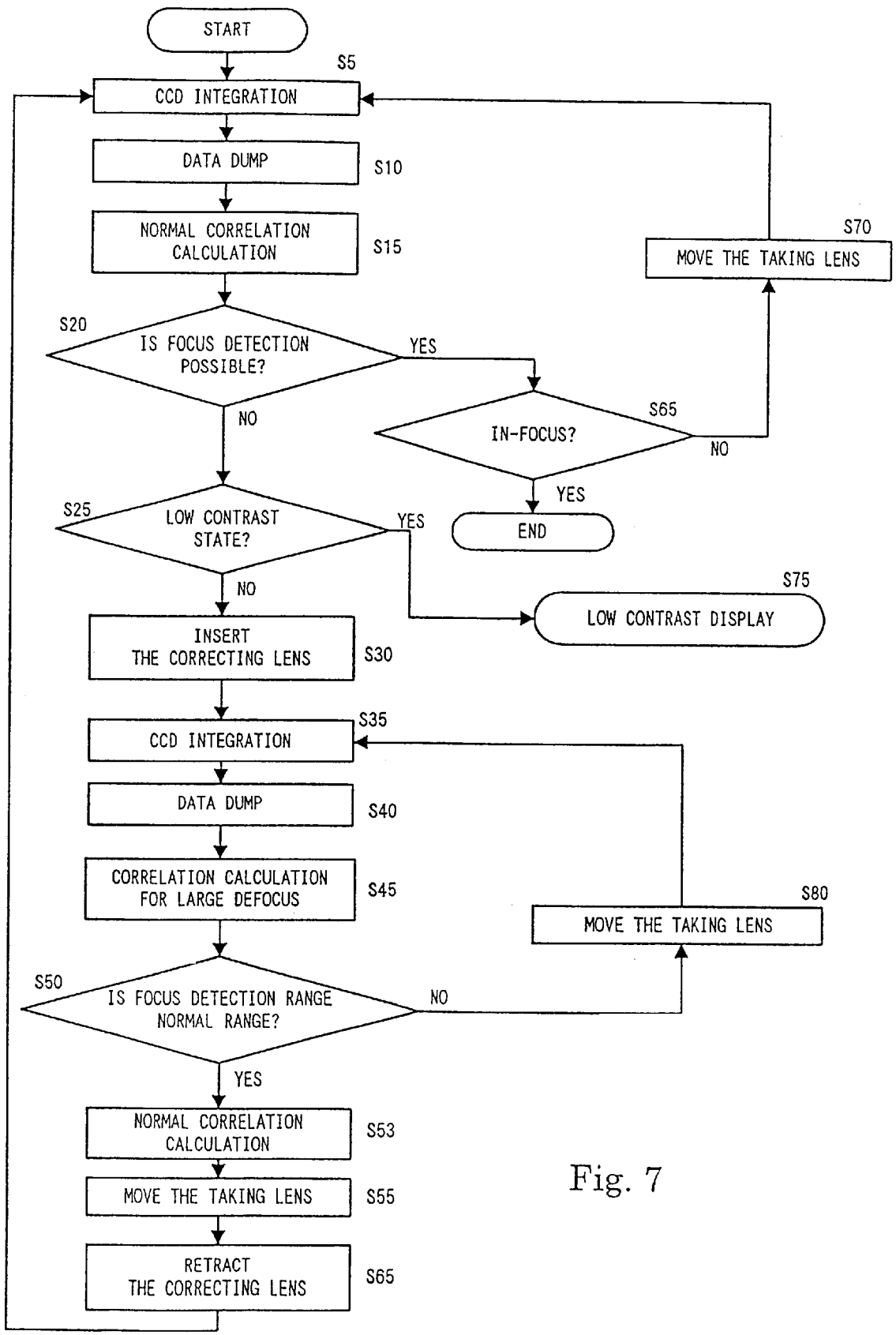
FIG. 7 is a flow chart showing another example of focus detection by the focus detecting device of the present invention.

The flow charts of FIGS. 6 and 7 show examples of focus detection by the focus detecting device of the present invention. FIG. 6 shows an instance in which a correcting concave lens or convex lens is not used when a large defocus occurs, and FIG. 7 shows an instance in which a correcting concave lens or convex lens is used when a large defocus occurs. In the drawings, the reference symbol DF represents defocus.

In FIG. 6, when focus detection starts, in step #5 the CCD sensor 4 is performs CCD integration. In step #10 the obtained data are dumped. Then, in step #15, the correlation calculation is performed in normal focus detection. In step #20 a determination is made as to whether or not focus detection is possible; when focus detection is not possible, the routine moves to step #25. In step #25 a determination is made as to whether or not the object is in a so-called low contrast state; when the object is not in a low contrast state, the routine moves to step #30.

In step #30 a determination is made as to whether or not the taking lens is a lens having a large amount of defocus such as a macro lens; if the taking lens is a large defocus lens, the routine moves to step #35. In step #35 the correlation calculation is performed during large defocus, then in step #40 the taking lens is moved based on the correlation calculation result, and the routine returns to step #5.

When focus detection is possible in step #20, the routine jumps to step #45. In step #45 a determination is made as to whether or not the image is focused; if the image is focused, focus detection ends. If the image is not focused, the routine moves to step #50, and the taking lens is driven based on the correlation calculation result of step #15, then the routine returns to step #5. When a low contrast state is determined in step #25, the routine jumps to step #55, and a low contrast display is executed. When the taking lens is not a lens having a large amount of defocus in step #30, the routine jumps to step #60, and a low contrast scan is executed.

In FIG. 7, when focus detection starts, in step S5 the CCD sensor 4 is performs CCD integration. In step S10 the obtained data are dumped. Then, in step S15, the correlation calculation is performed in normal focus detection. In step S20 a determination is made as to whether or not focus detection is possible; when focus detection is not possible, the routine moves to step S25. In step S25 a determination is made as to whether or not the object is in a so-called low contrast state; when the object is not in a low contrast state, the routine moves to step S30.

When the taking lens is a lens having a large amount of defocus such as a macro lens, in step S30 the previously mentioned correcting concave lens and convex lens are inserted. In step S35 the CCD sensor 4 performed CCD integration. Then, in step S40 the obtained data are dumped. In step S45 the correlation calculation is performed in focus detection for a taking lens having a large amount of defocus. In step S50 a determination is made as to whether or not the focus detection range is within the focus detection range of the normal correlation calculation; if the focus detection range is not within the focus detection range of the normal correlation calculation, the routine jumps to step S80.

In step S80 the taking lens is moved based on the correlation calculation result for a lens having a large amount of defocus in step S45, and the routine returns to step S5. When the focus detection range is within that of the normal correlation calculation in step S50, the routine moves to step S53. In step S53 the normal correlation calculation is performed. Then, in step S55 the taking lens is moved based on the normal correlation calculation result of step S35. In step S60 the corrective concave lens and convex lens are retracted, and the routine returns to step S5.

When focus detection is possible in step S20, the routine jumps to step S65. In step S65 a determination is made as to whether or not the image is focused; if the image is focused, focus detection ends. If the image is not focused, the routine moves to step S70, and the taking lens is driven based on the normal correlation calculation result of step S15, then the routine returns to step S5. When a low contrast state is determined in step S25, the routine jumps to step S75, and a low contrast display is executed.

Figure 8:
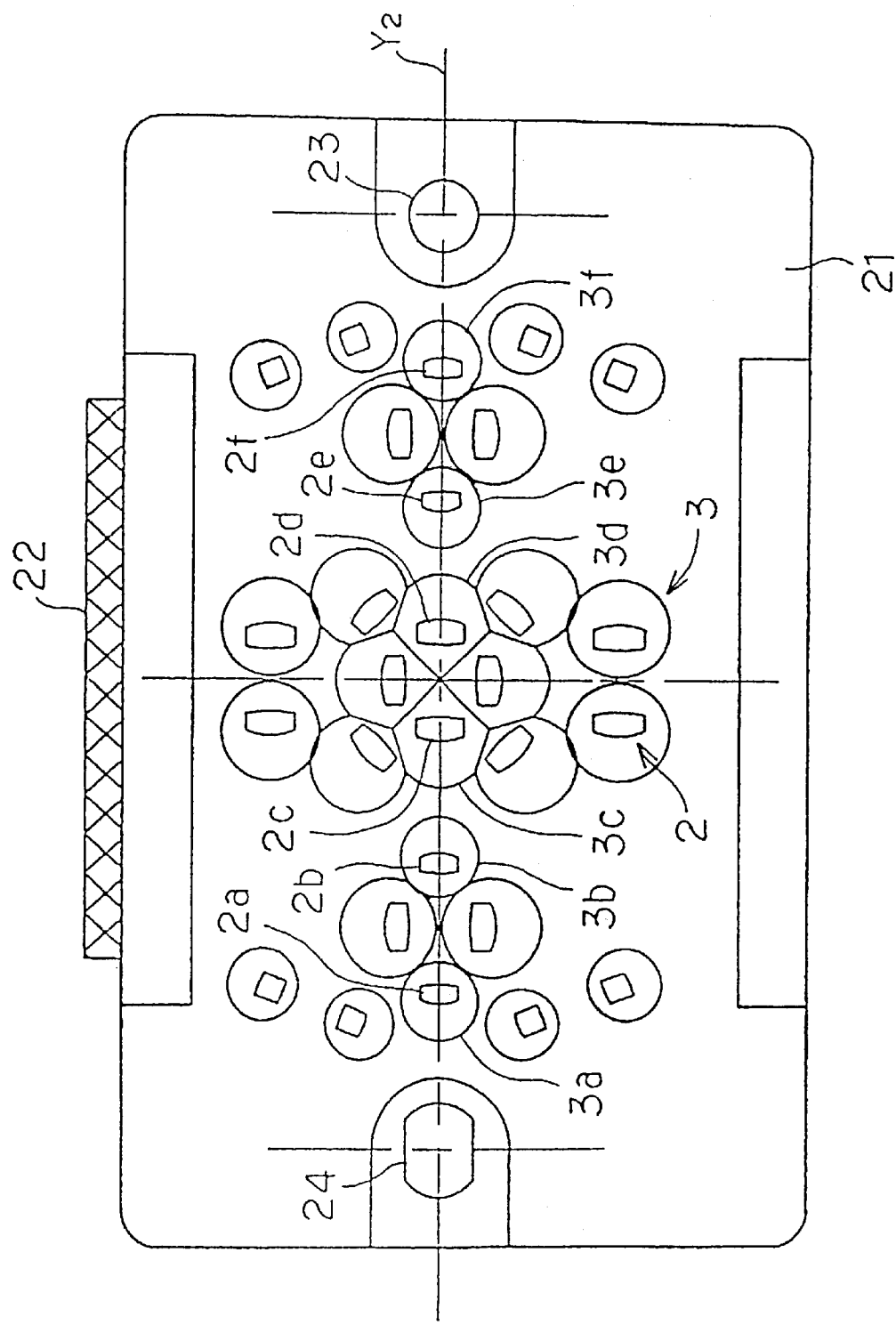
FIG. 8 is an enlarged front view of an example of the focus detecting unit used for multi-point autofocus.

FIG. 8 is a front view showing an enlargement of an example of a focus detecting module for a multi-point autofocus. In the drawing, the various elements of the aperture mask 2 and the various elements of the separator lens 3 corresponding thereto are arrayed as 28 individual elements. Among these elements, the aperture mask 2a~2f and the lenses 3a~3f arrayed in a horizontal line on the Y2-axis are used in the focus detecting device of the present embodiment described above. Reference number 21 is the package of this focus detecting module. Reference number 22 is a connector for electrically connecting the CCD sensor 4 (not illustrated) to a camera body. Reference number 23 and 24 refer to mounting holes.

Figure 9:
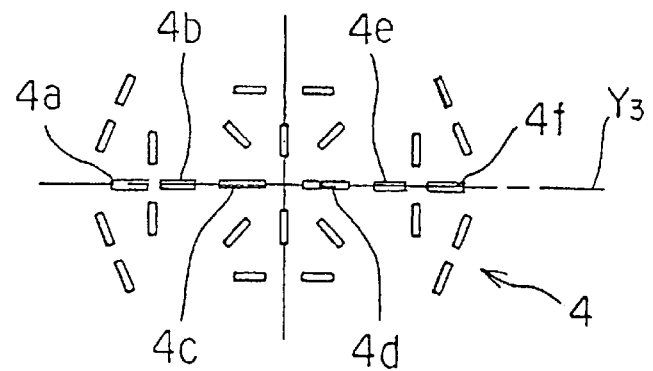
FIG. 9 is an enlarged front view of an example of the sensor layout of the focus detecting unit of FIG. 8.
Figure 11:
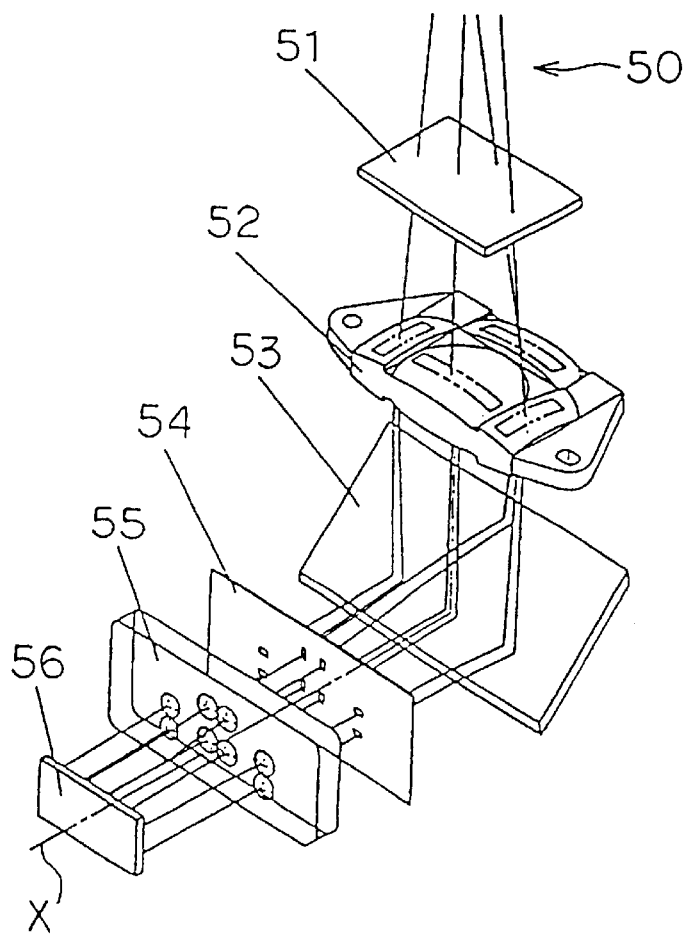
FIG. 11 is a perspective view of a conventional autofocus module of the phase difference detecting method.

FIG. 9 is a front view showing an enlargement of an example of the sensor layout of the focus detecting module. In the drawing, the 28 individual line sensors comprising the elements of the CCD sensor 4 are arrayed to correspond to the various elements of the aperture mask 2 and the separator lens 3. Among these sensors, the line sensors 4a~4f arrayed in a horizontal line on the Y3-axis are used in the focus detecting device of the present embodiment described above.

The concept of augmentation of the focus detection range by changing the combination of the sensors as in the present invention is not limited to the phase difference detecting method described in the present embodiment as the autofocus method used in a camera. For example, this concept may also be applied to the triangulation survey method used as the rangefinding method mainly in so-called lens shutter cameras. The triangulation survey method is, for example, passive type methods or infrared active type methods.

The relay optical system discussed in the present embodiment corresponds to the separator lens of the present embodiment. Furthermore, the image forming plane corresponds to the film-equivalent plane, and the sensor pairs correspond to combinations of the each line sensors comprising the standard area and the reference area on the CCD sensor.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A focus detecting device comprising:

an optical system which forms an image of a photographic subject;

a first sensor pair having a first image sensor and a second image sensor which receives light flux from said subject through said optical system;

a second sensor pair having a third image sensor and a fourth image sensor which receives light flux from said subject through said optical system;

a first focus detector which detects a focus condition of said optical system based on outputs of said first sensor pair;

a second focus detector which detects a focus condition of said optical system based on outputs of said second sensor pair; and a third focus detector which detects a focus condition of said optical system based on outputs of said first image sensor and said third image sensor.

2. A focus detecting device as claimed in claim 1, wherein said first image sensor and said third image sensor are arranged at symmetrical positions relative to an optical axis of said optical system.

3. A focus detecting device as claimed in claim 1, wherein said focus detecting device further comprising a focus correcting lens for correcting said light flux from said subject.

4. A focus detecting device as claimed in claim 3, wherein said focus correcting lens is inserted directly anterior to said first image sensor and said third image sensor when said third focus detector is executed.

5. A focus detecting device as claimed in claim 1, wherein said focus detecting device further comprising a controller for determining an execution of said third focus detector based on a defocus amount.

6. A focus detecting device as claimed in claim 1, wherein said first sensor pair and said second sensor pair are arranged at extra-axis of said optical system.

7. A focus detecting device as claimed in claim 1, wherein each of said focus detectors which detects a focus condition of said optical system using a phase difference detection method.

8. A focus detecting device comprising:

an optical system which forms an image of a photographic subject;

a first sensor pair having a first image sensor and a second image sensor which receives light flux from said subject through said optical system;

a second sensor pair having a third image sensor and a fourth image sensor which receives light flux from said subject through said optical system;

a third sensor pair having a fifth image sensor and a sixth image sensor which receives light flux from said subject through said optical system; and a focus adjuster which adjusts a focus condition of said optical system based on outputs of said first image sensor, said third image sensor and said third sensor pair.

9. A method for focus detection used in a focus detection device, comprising the steps of:

receiving light flux from a photographic subject by a first sensor pair having a first image sensor and a second image sensor;

receiving light flux from a photographic subject by a second sensor pair having a third image sensor and a fourth image sensor;

detecting a focus condition of an optical system based on outputs of said first image sensor and said third image sensor.

* * * * *